United States Patent
Kim et al.

(10) Patent No.: US 8,925,738 B2
(45) Date of Patent: Jan. 6, 2015

(54) WATER TREATMENT MEMBRANE HAVING HIGH CHLORINE RESISTANCE AND HIGH PERMEABILITY AND METHOD OF MANUFACTURING THE SAME

(71) Applicant: LG Chem, Ltd., Seoul (KR)

(72) Inventors: Jae-Hong Kim, Daejeon (KR); Young-Hoon Ko, Daejeon (KR); Chong-Kyu Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/256,635

(22) Filed: Apr. 18, 2014

(65) Prior Publication Data

US 2014/0224728 A1 Aug. 14, 2014

Related U.S. Application Data

(63) Continuation of application No. PCT/KR2013/011003, filed on Nov. 29, 2013.

(30) Foreign Application Priority Data

Nov. 30, 2012 (KR) .................. 10-2012-0138299
Nov. 29, 2013 (KR) .................. 10-2013-0147039

(51) Int. Cl.
| | | |
|---|---|---|
| *B01D 39/00* | (2006.01) | |
| *B01D 39/14* | (2006.01) | |
| *B29C 67/20* | (2006.01) | |
| *B01D 63/00* | (2006.01) | |
| *B01D 71/82* | (2006.01) | |
| *B01D 67/00* | (2006.01) | |
| *B01D 69/12* | (2006.01) | |
| *B01D 61/02* | (2006.01) | |
| *B01D 71/56* | (2006.01) | |

(52) U.S. Cl.
CPC ............. *B01D 71/56* (2013.01); *B01D 71/82* (2013.01); *B01D 67/00* (2013.01); *B01D 69/12* (2013.01); *B01D 61/02* (2013.01)
USPC .............. 210/500.38; 210/321.6; 210/321.75; 210/257.2; 264/49; 427/244

(58) Field of Classification Search
CPC ........ B01D 71/56; B01D 69/12; B01D 69/10; B01D 61/025; B01D 2323/30; B01D 69/02; B01D 2325/30; B01D 63/021; B01D 63/08; B01D 67/0093
USPC .............. 210/500.38, 321.6, 321.75, 500.27, 210/257.2; 264/48–49, 41; 427/244–245
See application file for complete search history.

(56) References Cited

U.S. PATENT DOCUMENTS

| | | | | |
|---|---|---|---|---|
| 4,384,128 | A * | 5/1983 | Krespan et al. | 549/550 |
| 5,593,588 | A * | 1/1997 | Kim et al. | 210/490 |

(Continued)

FOREIGN PATENT DOCUMENTS

| | | | |
|---|---|---|---|
| KR | 10-2011-0042343 A | 4/2011 | |
| KR | 10-2011-0110362 A | 10/2011 | |

(Continued)

*Primary Examiner* — Ana Fortuna
(74) *Attorney, Agent, or Firm* — McKenna Long & Aldridge, LLP

(57) ABSTRACT

The present disclosure relates to a method of manufacturing a water treatment membrane having high chlorine resistance and high permeability, the method including: forming an aqueous amine solution layer on a porous support, using an aqueous amine solution including a fluorine compound having an epoxy group in a terminal thereof and an amine compound; and forming a polyamide layer containing the fluorine compound by bringing an organic solution containing acyl halide into contact with the aqueous amine solution layer, and a water treatment membrane manufactured using the same.

16 Claims, 2 Drawing Sheets

(56) References Cited

U.S. PATENT DOCUMENTS

| | | | |
|---|---|---|---|
| 5,922,104 A * | 7/1999 | Park et al. | 95/51 |
| 8,426,487 B2 * | 4/2013 | Shin et al. | 522/160 |
| 8,770,414 B2 * | 7/2014 | Lee et al. | 210/490 |
| 2007/0163951 A1 | 7/2007 | McGrath et al. | |
| 2009/0277837 A1 | 11/2009 | Liu et al. | |
| 2010/0216899 A1 * | 8/2010 | Allen et al. | 521/27 |
| 2011/0189469 A1 | 8/2011 | Stenzel et al. | |
| 2014/0224728 A1 * | 8/2014 | Kim et al. | 210/500.33 |

FOREIGN PATENT DOCUMENTS

| | | | |
|---|---|---|---|
| WO | WO 2009/137245 | * | 11/2009 |
| WO | WO 2010/015599 | * | 2/2010 |

* cited by examiner

WATER TREATMENT MEMBRANE HAVING HIGH CHLORINE RESISTANCE AND HIGH PERMEABILITY AND METHOD OF MANUFACTURING THE SAME

This application is a Continuation Bypass Application of International Patent Application No. PCT/KR2013/011003, filed on Nov. 29, 2013, and claims the benefit of Korean Patent Application Nos. 10-2012-0138299, filed on Nov. 30, 2012 and 10-2013-0147039, filed on Nov. 29, 2013, in the Korean Intellectual Property Office, all of which are incorporated herein by reference in their entirety.

BACKGROUND OF THE INVENTION

1. Field of the Invention

The present disclosure relates to a water treatment membrane having high chlorine resistance and high permeability and a method of manufacturing the same, and more particularly, a water treatment membrane having superior chlorine resistance and permeability by including a fluorine compound in a polyamide layer and a method of manufacturing the same.

2. Description of the Related Art

An osmosis phenomenon refers to a phenomenon in which a solvent moves from a solution having a low solute concentration to another solution having a high solute concentration by passing through a semipermeable separation membrane isolating the two solutions. In this case, pressure acting on the solution having a high solute concentration through the movement of the solvent refers to osmotic pressure. However, when external pressure having a level higher than that of osmotic pressure is applied, the solvent moves towards the solution having a low solute concentration, and such a phenomenon is known as reverse osmosis. Various types of salt or organic material may be separated by a semipermeable membrane using a pressure gradient as driving force, according to the principle of reverse osmosis. A water treatment membrane using a reverse osmosis phenomenon has been used to separate a molecular-level material, remove salts from salt water or sea water and supply water for domestic, commercial and industrial purposes.

The water treatment membrane may representatively be a polyamide-based water treatment membrane, by way of example. The polyamide-based water treatment membrane is manufactured by a method of forming a polyamide active layer on a microporous layer support. More particularly, the polyamide-based water treatment membrane is prepared by forming a polysulfone layer on a non-woven fabric to form a microporous support, dipping the microporous support in an aqueous m-phenylene diamine (mPD) solution to form an mPD layer, and dipping the mPD layer in an organic trimesoyl chloride (TMC) solvent to allow the mPD layer to be brought into contact with the TMC so as to be interfacially polymerized to thereby form a polyamide layer.

Meanwhile, such a water treatment membrane needs to satisfy several conditions so as to be used for commercial purposes, and one of the conditions is a high salt rejection rate. A commercially required salt rejection rate of the water treatment membrane may be at least 97% or more in brackish water. Another crucial property of the water treatment membrane may be a capability of allowing a relatively large amount of water to penetrate therethrough at a relatively low pressure, that is, a high permeate flux. In general, a membrane permeate flux may be 10 gallon/ft$^2$-day (gfd) at a pressure of 800 psi in seawater, and may be 15 gfd or more at a pressure of 220 psi in salt water. However, since an oppositional relationship may exist between the salt rejection rate and the permeate flux properties, the manufacturing of a water treatment membrane having a superior salt rejection rate as well as a high permeate flux may be infeasible in practice.

In addition, in the case of the polyamide-based water treatment membrane, when the membrane is exposed to a chlorine radical, the salt rejection rate may be sharply deteriorated while a polyamide combination is dissolved. Thus, there is demand for a polyamide-based water treatment membrane to prevent a degradation in performance of a product and to have high chlorine resistance for improvements in a life cycle thereof. To this end, a method of forming a coating layer containing a fluorine compound having superior chlorine resistance on a polyamide layer has been suggested. However, in such a method, since a separate process needs to be undertaken to form the coating layer, the number of processes may be increased and due to the formation of the coating layer, the permeate flux of the polyamide layer may be lowered.

SUMMARY OF THE INVENTION

An aspect of the present disclosure provides a polyamide-based water treatment membrane having superior salt rejection rate and permeate flux properties as well as having superior chlorine resistance, and a method of manufacturing the same.

According to an aspect of the present disclosure, there is provided a method of manufacturing a water treatment membrane having high chlorine resistance and high permeability, the method including: forming an aqueous amine solution layer on a porous support, using an aqueous amine solution including a fluorine compound having an epoxy group in a terminal thereof and an amine compound; and forming a polyamide layer containing the fluorine compound by bringing an organic solution containing acyl halide into contact with the aqueous amine solution layer.

According to another aspect of the present disclosure, there is provided a water treatment membrane having high chlorine resistance and high permeability, the water treatment membrane including a porous support and a polyamide layer formed on the porous support, wherein the polyamide layer includes an interfacial polymer between a fluorine-containing amine compound generated through a reaction between a fluorine compound having an epoxy group in a terminal thereof and an amine compound and an acyl halide compound.

In this case, the fluorine compound having the epoxy group in the terminal thereof is a compound represented by the following Chemical Formula 1,

[Chemical Formula 1]

where, R is a C$_{1-20}$ alkyl group including a fluorine atom or fluorine, m is 0 or 1, and n is an integer of 0 to 10.

The water treatment membrane according to an exemplary embodiment of the present disclosure may include a fluorine compound having excellent chlorine resistance in a polyamide layer to thereby have superior chlorine resistance.

Further, in the water treatment membrane according to an exemplary embodiment of the present disclosure, since an amide layer may be formed using an aqueous amine compound solution including fluorine, interfacial polymerization between acyl halide and an amine compound may be rapidly generated due to water repellency of fluorine, and a polyamide layer having a relatively large protrusion as compared to the case of the related art may be formed, such that permeate flux properties may be significantly excellent.

DETAILED DESCRIPTION OF THE PREFERRED EMBODIMENTS

Figure 1:
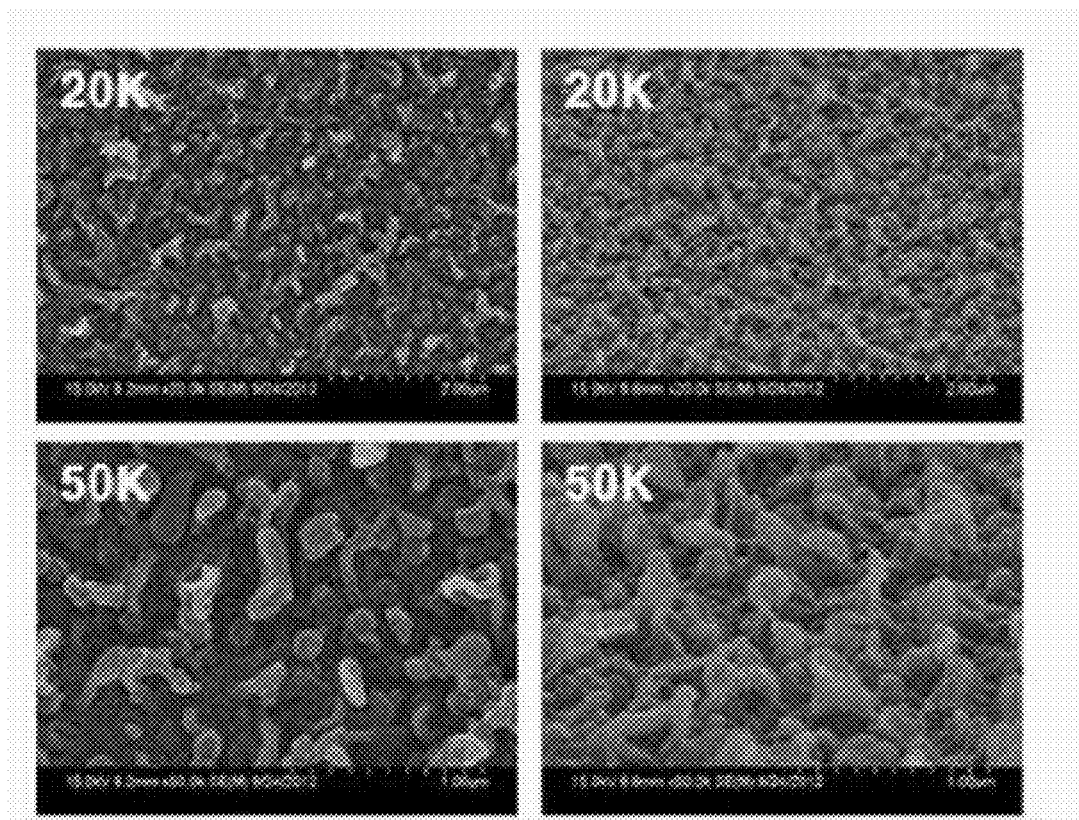
FIG. 1 illustrates scanning electron microscope (SEM) photographs obtained by imaging a surface of a polyamide layer manufactured according to Comparative Example 1.

Hereinafter, exemplary embodiments of the present disclosure will be described in detail.

As a result of repeated research undertaken in order to manufacture a polyamide-based water treatment membrane having superior salt rejection rate, permeate flux, and chlorine resistance properties, the inventors of the present disclosure found that such a polyamide-based water treatment membrane having superior salt rejection rate, permeate flux, and chlorine resistance properties could be manufactured by forming a polyamide layer through the addition of a fluorine compound having an epoxy group in a terminal thereof to an aqueous amine solution and then, completed the present disclosure.

More particularly, an exemplary embodiment of the present disclosure may provide a method of manufacturing a water treatment membrane having high chlorine resistance and high permeability, the method comprising: forming an aqueous amine solution layer on a porous support, using an aqueous amine solution including a fluorine compound having an epoxy group in a terminal thereof and an amine compound; and forming a polyamide layer containing the fluorine compound by bringing an organic solution containing acyl halide into contact with the aqueous amine solution layer.

First, the aqueous amine solution layer may be formed on a microporous support, using the aqueous amine solution including the fluorine compound having the epoxy group in the terminal thereof and the amine compound.

In this case, the microporous support may be formed by casting a polymer material on a non-woven fabric and examples of the polymer material may include polysulfone, polyether sulfone, polycarbonate, polyethylene oxide, polyimide, polyether imide, polyether ether ketone, polypropylene, polymethylpentene, polymethylchloride, polyvinylidene fluoride, and the like, but are not limited thereto. Among these, the polymer material may be, particularly, polysulfone.

Meanwhile, the aqueous amine solution may be an aqueous solution including the fluorine compound having the epoxy group in the terminal thereof and the amine compound. In this case, the fluorine compound having the epoxy group in the terminal thereof is not limited, but may be a compound represented by the following Chemical Formula 1.

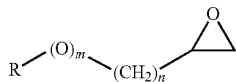

[Chemical Formula 1]

Here, R is a $C_{1-20}$ alkyl group including a fluorine atom or fluorine, m is 0 or 1, and n is an integer of 0 to 10, preferably, an integer of 1 to 5. Preferably, R is a $C_{1-20}$ alkyl group including 1 to 27 fluorine atoms, preferably, 3 to 10 fluorine atoms. In this case, the alkyl group may be a linear or branched group.

Meanwhile, the fluorine compound represented by Chemical Formula 1 may have about 4 to 20 carbon atoms in total, preferably, 6 to 20 carbon atoms in total, therein. In the case of the compound having less than carbon atoms in total, reactivity between the fluorine compound and the amine compound may be increased to result in a degradation in reactivity between acyl halide and the amine compound during interfacial polymerization, thereby degrading the degree of polymerization of the generated polyamide layer. This means a lowering of the salt rejection rate. Further, in the case of the compound having greater than 20 carbon atoms in total, reactivity between the fluorine compound and the amine compound may be lowered, such that a possibility that the fluorine compound may be combined with a polyamide main chain during the interfacial polymerization between acyl halide and the amine compound may be decreased.

Specific examples of the fluorine compound having the epoxy group in the terminal thereof may include 2-[(2,2,3,3-tetrafluoropropoxy)methyl]oxirane), 2-{[(2,2,3,3,4,4,5,5-octafluoropentyl)oxy]methyl}oxirane), 2-[(1,1,2,2-tetrafluoroethoxy)methyl]oxirane), fluorinated mono glycidyl ether and the like.

Meanwhile, the amine compound may be a compound including two or more amine groups, for example, m-phenylenediamine, p-phenylenediamine, 1,3,6-benzene triamine, 4-chloro-1,3-phenylenediamine, 6-chloro-1,3-phenylenediamine, 3-chloro-1,4-phenylenediamine, or a mixture thereof, but is not limited thereto.

Meanwhile, the aqueous amine solution may be manufactured by dissolving the fluorine compound and the amine compound in water and in this case, a mole ratio of the fluorine compound and the amine compound in the aqueous amine solution may be about 1:1000 to 1:10, preferably, about 1:1000 to 1:50. When the mole ratio of the fluorine compound and the amine compound in the aqueous amine solution satisfies the range described above, superior chlorine resistance, permeate flux, and salt rejection rate properties may be exhibited.

In general, since the fluorine compound may be barely dissolved in the aqueous amine solution or the organic solution containing acyl halide, it is difficult to introduce the fluorine compound into the polyamide layer. However, in the case of adding the fluorine compound having the epoxy group in the terminal thereof, to the aqueous amine solution as in the present disclosure, since reactivity between an amine group and the epoxy group may be significantly high, the amine group of the amine compound and the epoxy group of the fluorine compound may react with each other to allow the fluorine compound to be dissolved in the aqueous amine solution, thereby resulting in the formation of the aqueous amine solution layer having fluorine atoms introduced thereto.

For example, in a case in which the fluorine compound is the compound represented by Chemical Formula 1 and the amine compound is phenylenediamine, the amine compound having fluorine atoms introduced thereto and represented by the following Chemical Formula 2 may be present in the aqueous amine solution.

[Chemical Formula 2]

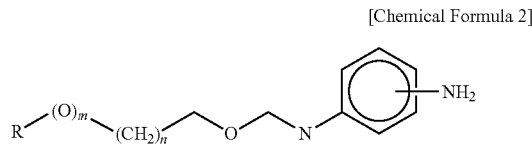

Here, R, m and n are identical to those defined in Chemical Formula 1.

Meanwhile, as a method of introducing the fluorine compound to the polyamide layer, a method of adding the fluorine compound having the epoxy group in the terminal thereof to the organic solution containing acyl halide, rather than to the aqueous amine solution, may be considered. However, according to research undertaken by the inventors of the present disclosure, in a case in which the fluorine compound is added to the organic solution containing acyl halide, improvements in chlorine resistance due to the introduction of fluorine are insignificant, as compared to the case of adding the fluorine compound to the aqueous amine solution. This result is determined due to the fact that a rate of reaction between the amine compound and the epoxy group is higher than that between an acyl halide compound and the epoxy group. Further, this result is determined due to the fact that since an acyl halide compound generally used in the forming of a polyamide layer has three or more functional groups, when the acyl halide compound is combined with the fluorine compound having the epoxy group in the terminal thereof, reactivity therebetween may be deteriorated due to the sterically hindered effect, or even when a reaction therebetween may occur, a possibility that fluorine is disposed in a chain center may be high, such that an exposure of fluorine to a surface of the polyamide layer may be infeasible. On the other hand, in the case of the amine compound used in the forming of the polyamide layer, since the number of functional groups thereof is less than that of the acyl halide compound, a possibility that fluorine combined with the amine compound may be disposed at a distal end of a polyamide layer chain may be high, such that the fluorine compound may be easily exposed to the surface of the polyamide layer, thereby resulting in superior chlorine resistance according to inherent characteristics of fluorine.

Meanwhile, a method of forming the aqueous amine solution layer may be performed by a method of forming an aqueous amine solution layer commonly known in the technical field to which the present disclosure pertains, for example, a dipping method, a coating method, a spraying method or the like. Meanwhile, when the aqueous amine solution layer is formed on the porous support by the method described above, a process for removing an excessive amount of the aqueous amine solution may be performed, if necessary. In this case, the removal of the aqueous amine solution may be undertaken, using a bar, a roller, an air knife, a sponge, or the like. Further, after the removal of the aqueous amine solution, a drying process may be additionally performed if necessary.

Then, the organic solution containing acyl halide may come into contact with the aqueous amine solution layer to form the polyamide layer containing the fluorine compound.

In this case, the organic solution containing acyl halide, an acyl halide compound, may include trimesoyl chloride, isophthaloyl chloride, terephthaloyl chloride or a mixture thereof. As an organic solvent, an aliphatic hydrocarbon solvent, for example, freon, and a hydrophobic liquid unmixed with water such as hexane having 8 to 12 carbon atoms, cyclohexane, heptane or alkane, for example, alkane having 8 to 12 carbon atoms and mixtures thereof such as Isol-C (by Exxon Cor.), Isol-G (by Exxon Cor.) or the like may be used.

Meanwhile, a method of bringing the organic solution containing acyl halide into contact with the aqueous amine solution layer may be performed by a solution contact method commonly known in the art, for example, a dipping method, a coating method, a spraying method or the like.

As described above, when the organic solution containing acyl halide comes into contact with the aqueous amine solution layer, the amine compound in the aqueous amine solution and the acyl halide in the organic solution react with each other to form interfacial polymerization, thereby forming the polyamide layer.

Meanwhile, as described above, the aqueous amine solution layer may include a compound formed through a reaction between the epoxy group of the fluorine compound and the amine group of the amine compound (for example, the compound represented by Chemical Formula 2). However, the compound has fluorine introduced thereto and accordingly, exhibits relatively high oil- and water repellency, as compared to a polyfunctional amine compound to which fluorine is not introduced. That is, since reactivity between an amine group having fluorine introduced thereto and acyl halide may be relatively lowered and reactivity of an amine group having no fluorine introduced thereto with acyl halide may be relatively high as thereto, differences in a rate of polymerization and reactivity may be generated due to a difference between the two compounds. As described above, in a surface of the aqueous amine solution layer according to the exemplary embodiment of the present disclosure, a difference in the rate of polymerization may be maximized due to the introduction of fluorine and consequently, a polyamide layer having significantly high surface roughness may be formed as compared to the case of the related art, thereby leading to an increase in an active surface area of the polyamide layer. That is, the polyamide layer manufactured by the manufacturing method according to the exemplary embodiment of the present disclosure may have a superior permeate flux due to a wide active surface area thereof as compared to a polyamide layer manufactured by the related art method, and exhibit superior chlorine resistance due to inherent characteristics of fluorine.

Meanwhile, when the polyamide layer is formed, processes of drying and washing the polyamide layer may be undertaken. In this case, the drying may be performed at a temperature of 60° C. to 70° C. for about 5 to 10 minutes. Further, the washing is not particularly limited, but may be performed in an aqueous alkaline solution, by way of example. The aqueous alkaline solution usable in the washing is not particularly limited, but may be an aqueous sodium carbonate solution, by way of example. Specifically, the washing may be performed at room temperature for two or more hours.

The water treatment membrane according to the exemplary embodiment of the present disclosure, formed by the method describe above may include the porous support and the polyamide layer formed on the porous support. In this case, the polyamide layer may include an interfacial polymer between a fluorine-containing amine compound generated through the reaction between the fluorine compound having the epoxy group in the terminal thereof and the amine compound and the acyl halide compound.

Individual constitutions of the water treatment membrane according to the exemplary embodiment of the present disclosure are identical to those described above.

That is, the fluorine compound having the epoxy group in the terminal thereof may be a compound represented by Chemical Formula 1, and the amine compound may be a compound including two or more amine groups, for example, m-phenylenediamine, p-phenylenediamine, 1,3,6-benzene triamine, 4-chloro-1,3-phenylenediamine, 6-chloro-1,3-phenylenediamine, 3-chloro-1,4-phenylenediamine, or a mixture thereof.

The fluorine-containing amine compound generated through the reaction between the fluorine compound having the epoxy group in the terminal thereof and the amine compound may be a compound generated through the reaction between the epoxy group of the fluorine compound and the amine group of the amine compound. The fluorine-containing amine compound is not limited but may be a compound represented by Chemical Formula 2.

In addition, the acyl halide compound is not limited but may be trimesoyl chloride, isophthaloyl chloride, terephthaloyl chloride or a mixture thereof.

The water treatment membrane according to the exemplary embodiment of the present disclosure, including the interfacial polymer between the fluorine-containing amine compound generated through the reaction between the fluorine compound having the epoxy group in the terminal thereof and the amine compound and the acyl halide compound may have a significantly superior permeate flux performance than, as well as substantially the same level of salt rejection rate as a water treatment membrane according to the related art. The reason for this is that, due to the fluorine atoms combined with the amine compound, a protrusion of the polyamide layer is largely formed as compared to the case of the related art and consequently, the active surface area of the polyamide layer may be increased. Further, the water treatment membrane according to the exemplary embodiment of the present disclosure may contain fluorine atoms having chlorine resistance in the polyamide layer and thus, have significantly superior chlorine resistance properties.

Meanwhile, the water treatment membrane according to the exemplary embodiment of the present disclosure as described above may be used as a micro-filtration (MF) membrane, an ultra-filtration (UF) membrane, a nano-filtration (NF) membrane, a reverse osmosis (RO) membrane or the like. In particular, the water treatment membrane according to the exemplary embodiment of the present disclosure as described above may be used as a reverse osmosis (RO) membrane.

In addition, according to an exemplary embodiment of the present disclosure, a water treatment module including at least one water treatment membrane according to the exemplary embodiment of the present disclosure as described above may be provided. Specific types of the water treatment module according to the exemplary embodiment of the present disclosure are not particularly limited; however, examples thereof may include plate and frame modules, a tubular module, hollow and fiber modules, a spiral wound module and the like. Moreover, as long as the water treatment module according to the exemplary embodiment of the present disclosure includes the water treatment membrane according to the foregoing exemplary embodiment, other configurations and manufacturing methods and the like are not particularly limited, and general methods and elements commonly known in the art may be employed without limitation.

The water treatment module according to the exemplary embodiment of the present disclosure may be usefully used in a water treatment device such as a domestic/industrial water-purifying device, a sewage treatment device, a seawater-fresh water treatment device or the like.

MODES FOR CARRYING OUT THE INVENTION

Hereinafter, embodiments of the present disclosure will be described in detail with reference to concrete examples.

EXAMPLE 1

18% by weight of a polysulfone solid was added to an N,N-dimethylformamide (DMF) solution and dissolved therein at a temperature of 80 to 85° C. for 12 or more hours to obtain a homogeneous liquid phase. The solution having the homogeneous liquid phase was cast on a non-woven fabric formed of a polyester material and having a thickness of 95 to 100 μm to thereby form a porous polysulfone support.

After the polysulfone support was dipped in an aqueous solution including 2% by weight of m-phenylene diamine (mPD) and fluorinated mono glycidyl ether represented by the following Chemical Formula 3 in a mole ratio of 1000:1 for 2 minutes, an excessive amount of the aqueous solution on the support was removed therefrom using a roller under 25 psi of pressure and the porous polysulfone support was then dried for 1 minute at room temperature.

[Chemical Formula 3]

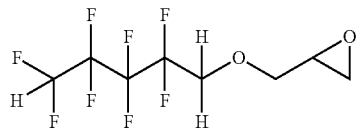

Next, after the support was dipped in a solution including 0.1% by volume of TMC (1,3,5-benzenetricarbonyl trichloride) with an Isol C solvent (SKC Corp.) for 1 minute, the support was dried for 10 minutes in an oven of 60° C. in order to remove an excessive amount of the organic solution. Thereafter, a membrane obtained by the method as described above was washed in 0.2% by weight of an aqueous sodium carbonate solution for two or more hours at room temperature and then washed with distilled water for 1 minute, such that a water treatment membrane including a polyamide layer having a thickness of 150 μm was obtained.

EXAMPLE 2

A water treatment membrane was manufactured using the same method as that of Example 1, with the exception that an aqueous solution including m-phenylene diamine (mPD) and fluorinated mono glycidyl ether was used in a mole ratio of 500:1.

EXAMPLE 3

A water treatment membrane was manufactured using the same method as that of Example 1, with the exception that an aqueous solution including m-phenylene diamine (mPD) and fluorinated mono glycidyl ether was used in a mole ratio of 100:1.

EXAMPLE 4

A water treatment membrane was manufactured using the same method as that of Example 1, with the exception that an aqueous solution including m-phenylene diamine (mPD) and fluorinated mono glycidyl ether was used in a mole ratio of 50:1.

COMPARATIVE EXAMPLE 1

A water treatment membrane was manufactured using the same method as that of Example 1, with the exception that an aqueous solution including no fluorinated mono glycidyl ether was used.

EXPERIMENTAL EXAMPLE 1

Measurement of Permeate Fluxes and Salt Rejection Rates

Initial salt rejection rates and Initial permeate fluxes were measured with respect to the water treatment membranes manufactured according to the Examples 1 to 4 and Comparative Example 1. The initial salt rejection rates and the initial permeate fluxes were measured while 32,000 ppm of an aqueous sodium chloride (NaCl) solution permeated through the water treatment membranes with a flux of 4500 ml/min at a temperature of 25° C., after the water treatment membranes were mounted in a reverse osmosis membrane cell apparatus including a flat panel type permeation cell, a high pressure pump, a reservoir, and a cooling device. The flat panel type permeation cell was a cross-flow type and an effective permeation area thereof was 140 cm². After the water treatment membrane was installed on the permeation cell, a preliminary operation was sufficiently conducted, using tertiary distilled water for about 1 hour in order to stabilize the evaluation equipment. Next, after 32,000 ppm of the aqueous sodium chloride (NaCl) solution was inputted and an equipment operation was conducted for about 1 hour until pressure and permeate flux reached a normal state, an amount of water permeated for 10 minutes was measured to calculate the permeate flux, and salt concentrations before and after the permeation were analyzed using a conductivity meter to calculate the salt rejection rate. The measured results are shown in the following Table 1.

TABLE 1

| | Salt Rejection Rate (%) | Initial Permeate Flux (GFD) |
|---|---|---|
| Example 1 | 99.05 | 39.07 |
| Example 2 | 99.11 | 40.84 |
| Example 3 | 99.15 | 45.66 |
| Example 4 | 98.98 | 47.98 |
| Comparative Example 1 | 99.03 | 35.32 |

EXPERIMENTAL EXAMPLE 2

Measurement of Chlorine Resistance

Chlorine resistance properties were measured with respect to the water treatment membranes manufactured according to the Examples 1 to 4 and Comparative Example 1. The measurement of chlorine resistance properties was performed using an aqueous mixed solution including 32,000 ppm of sodium chloride (hereinafter, referred to as 'NaCl') and 2,000 ppm of sodium hypochlorite (hereinafter, referred to as 'NaOCl'). Immediately after the mixture of the aqueous mixed solution, the evaluation equipment was operated under a pressure of 800 psi and performances of the membranes were evaluated. After the completion of measurement, the performances of the membranes were measured under a pressure of 800 psi after 6 hours and after 12 hours elapsed in a state in which the membranes were mounted in the evaluation equipment under the same conditions as those described above. The measured results are shown in the following Tables 2 and 3.

TABLE 2

| Classification | Initial salt rejection rate (%) | Salt rejection rate (%) after 6 hours | Salt rejection rate (%) after 12 hours |
|---|---|---|---|
| Example 1 | 99.05 | 98.81 | 98.43 |
| Example 2 | 99.11 | 99.03 | 98.87 |
| Example 3 | 99.15 | 99.02 | 98.99 |
| Example 4 | 98.98 | 98.73 | 97.47 |
| Comparative Example 1 | 99.03 | 97.86 | 88.39 |

TABLE 3

| Classification | Initial Permeate Flux (GFD) | Permeate flux (GFD) after 6 hours | Permeate flux (GFD) after 12 hours |
|---|---|---|---|
| Example 1 | 39.07 | 42.46 | 47.28 |
| Example 2 | 40.84 | 42.64 | 44.57 |
| Example 3 | 45.66 | 46.99 | 48.12 |
| Example 4 | 47.98 | 48.79 | 49.43 |
| Comparative Example 1 | 35.32 | 43.33 | 55.09 |

EXPERIMENTAL EXAMPLE 3

Measurement of Surface Properties

Figure 2:
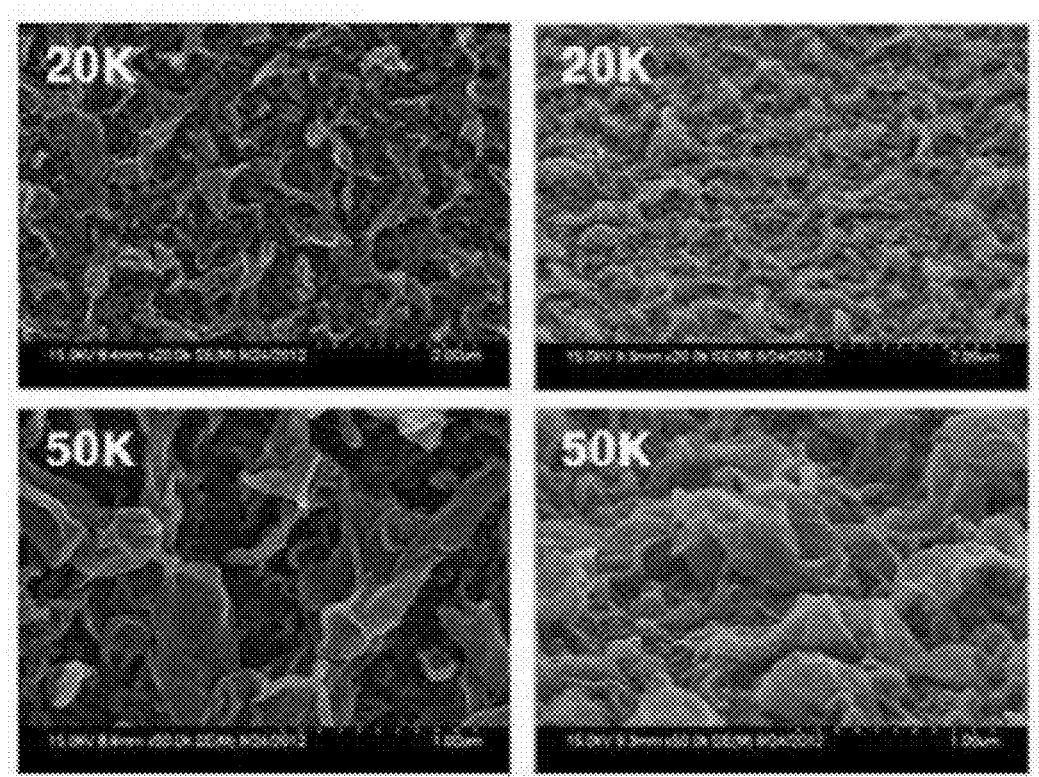
FIG. 2 illustrates scanning electron microscope (SEM) photographs obtained by imaging a surface of a polyamide layer manufactured according to Example 3.

Surfaces of the polyamide layers manufactured according to the Comparative Example 1 and Example 3 were imaged as scanning electron microscope (SEM) photographs. FIG. 1 illustrates the SEM photographs obtained by imaging a surface of the polyamide layer manufactured according to the Comparative Example 1. FIG. 2 illustrates the SEM photographs obtained by imaging a surface of the polyamide layer manufactured according to the Example 3. Through FIGS. 1 and 2, it could be confirmed that surface roughness of the polyamide layer manufactured according to the Example 3 was significantly greater than that of the polyamide layer manufactured according to the Comparative Example 1. This denotes that an active surface area of the Example 3 was wider than that of the Comparative Example 1.

The invention claimed is:

1. A method of manufacturing a water treatment membrane, comprising:
    forming an aqueous amine solution layer on a porous support, using an aqueous amine solution including a fluorine compound having an epoxy group in a terminal thereof and an amine compound; and
    forming a polyamide layer containing the fluorine compound by bringing an organic solution containing acyl halide into contact with the aqueous amine solution layer.

2. The method of claim 1, wherein the fluorine compound having the epoxy group in the terminal thereof is a compound represented by the following Chemical Formula 1,

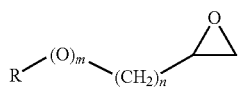

where, R is a $C_{1-20}$ alkyl group including a fluorine atom or fluorine, m is 0 or 1, and n is an integer of 0 to 10.

3. The method of claim 2, wherein the R is the $C_{1-20}$ alkyl group including 1 to 27 fluorine atoms.

4. The method of claim 2, wherein the n is an integer of 0 to 5.

5. The method of claim 2, wherein the compound represented by the Chemical Formula 1 has 4 to 20 carbon atoms in total, therein.

6. The method of claim 1, wherein the fluorine compound having the epoxy group in the terminal thereof is at least one selected from a group consisting of 2-[(2,2,3,3-tetrafluoropropoxy)methyl]oxirane), 2-{[(2,2,3,3,4,4,5,5-octafluoropentyl)oxy]methyl}oxirane), 2-[(1,1,2,2-tetrafluoroethoxy)methyl]oxirane), and fluorinated mono glycidyl ether.

7. The method of claim 1, wherein the aqueous amine solution includes the fluorine compound having the epoxy group in the terminal thereof and the amine compound in a mole ratio of 1:1000 to 1:10.

8. A water treatment membrane comprising a porous support and a polyamide layer formed on the porous support, wherein the polyamide layer includes an interfacial polymer between a fluorine-containing amine compound generated through a reaction between a fluorine compound having an epoxy group in a terminal thereof and an amine compound and an acyl halide compound.

9. The water treatment membrane of claim 8, wherein the fluorine compound having the epoxy group in the terminal thereof is a compound represented by the following Chemical Formula 1,

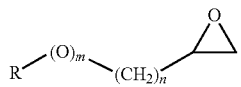

where, R is a $C_{1-20}$ alkyl group including a fluorine atom or fluorine, m is 0 or 1, and n is an integer of 0 to 10.

10. The water treatment membrane of claim 9, wherein the R is the $C_{1-20}$ alkyl group including 1 to 27 fluorine atoms.

11. The water treatment membrane of claim 9, wherein the n is an integer of 0 to 5.

12. The water treatment membrane of claim 9, wherein the compound represented by the Chemical Formula 1 has 4 to 20 carbon atoms in total, therein.

13. The water treatment membrane of claim 8, wherein the fluorine compound having the epoxy group in the terminal thereof is at least one selected from a group consisting of 2-[(2,2,3,3-tetrafluoropropoxy)methyl]oxirane), 2-{[(2,2,3,3,4,4,5,5-octafluoropentyl)oxy]methyl}oxirane), 2-[(1,1,2,2-tetrafluoroethoxy)methyl]oxirane), and fluorinated mono glycidyl ether.

14. The water treatment membrane of claim 8, wherein the fluorine-containing amine compound is a compound represented by the following Chemical Formula 2,

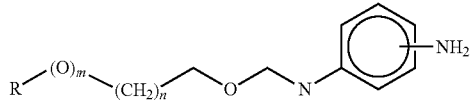

where, R is a $C_{1-20}$ alkyl group including a fluorine atom or fluorine, m is 0 or 1, and n is an integer of 0 to 10.

15. A water treatment module comprising at least one water treatment membrane of claim 8.

16. A water treatment device comprising at least one water treatment module of claim 15.

* * * * *